Patented May 6, 1930

1,757,419

UNITED STATES PATENT OFFICE

WALTER DUISBERG, OF LEVERKUSEN, AND WINFRID HENTRICH AND LUDWIG ZEH, OF WIESDORF, NEAR COLOGNE, GERMANY, ASSIGNORS TO GENERAL ANILINE WORKS, INC., OF NEW YORK, N. Y., A CORPORATION OF DELAWARE

MONOAZO DYESTUFFS PRODUCED FROM AMINO-BENZYL-ω-SULPHONIC ACIDS

No Drawing. Application filed February 12, 1926, Serial No. 87,959, and in Germany February 13, 1925.

The present invention relates to new azo dyestuffs of the general formula:

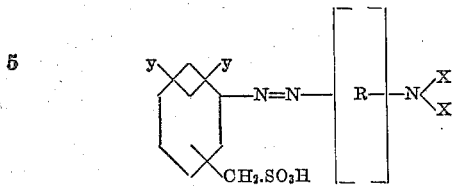

wherein R represents an aromatic nucleus of the group including the benzene and naphthalene series, X represents hydrogen, alkyl, aryl or aralkyl, and y represents hydrogen or the nitro group.

The new dyestuffs are obtained by diazotizing a compound of the general formula:

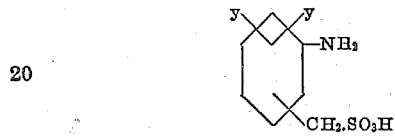

and coupling the diazo compound thus obtained with a compound of the general formula:

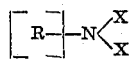

wherein R represents an aromatic nucleus of the group including the benzene and naphthalene series and X represents hydrogen, alkyl, aryl or aralkyl.

We have found that when using as coupling component an aromatic amine not substituted by a sulphonic acid, carboxylic acid or hydroxyl group, monoazo dyestuffs are obtained which possess the valuable property of dyeing directly acetyl celluloses, cellulose ethers and their conversion products in a neutral or weakly acid bath. They dye acetate silk clear, deep, yellow to blue shades of very good fastness to light and water; and in addition they are characterized by extraordinary fastness to washing. These new dyestuffs dye wool in very level light-fast shades.

We have furthermore found that when using as coupling component an aromatic amine substituted by a sulphonic acid, carboxylic acid or hydroxyl group, dyestuffs are obtained which are specially adapted for dyeing wool. This group of our new azo dyestuffs is described and claimed in U. S. application Serial No. 87,958, filed February 12, 1926.

The following examples serve to illustrate our invention without limiting it thereto.

*Example 1*

187 parts by weight of 4-aminobenzyl-ω-sulphonic acid

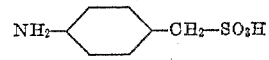

are diazotized and combined at 0° with 169 parts by weight of diphenylamine which has been dissolved in a sufficient amount of alcohol. After completion of the coupling reaction, the dyestuff is isolated in the form of the free acid and is converted in the well known manner into the sodium salt which crystallizes in fine yellow flakes. The dyestuff dyes acetate silk deep, clear yellow shades. The dyestuff, in the form of its sodium salt, has most probably the formula:

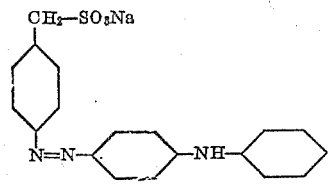

*Example 2*

249 parts by weight of the ammonium salt of 5-nitro-2-aminobenzyl-ω-sulphonic acid are diazotized in the usual way and combined with 211 parts by weight of ethylbenzyl-aniline dissolved in water at 5° with some mineral acid. The dyestuff formed is worked up as in Example 1. On acetate silk it produces a clear red. The dyestuff, in the form of its sodium salt, has most probably the formula:

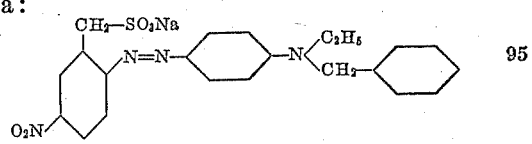

*Example 3*

277 parts by weight of 3.5-dinitro-2- aminobenzyl-ω-sulphonic acid (prepared from the 3.5-dinitro-2-chlorbenzyl-ω-sulphonic acid disclosed in German Patent 141,783, Kalle & Co., patented from March 27, 1902, published April 26, 1903 by substitution of an amino group for the halogen in the usual way) are diazotized and combined at 0° with an aqueous solution of 207 parts by weight of ethyl-2-naphthylamine. The formation of the dyestuff is very quickly completed. Its sodium salt dyes acetate silk very clear, strongly bluish violet shades.

The dyestuff, in the form of its sodium salt, has most probably the formula:

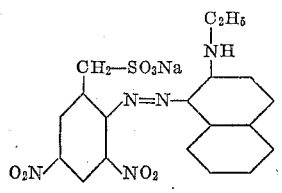

*Example 4*

277 parts by weight of 3.5-dinitro-4-aminobenzyl-ω-sulphonic acid are dissolved in concentrated sulfuric acid at ordinary temperature and diazotized with a nitrosyl sulfuric acid which contains 69 parts by weight of 100% sodium nitrite. The completed diazotization mixture is allowed to slowly run with stirring into an aqueous solution of 179 parts by weight of 2-naphthylamine hydrochloride to which a large amount of ice has been added. The coupling is completed very soon. If necessary, sodium chloride is added for the purpose of completely precipitating the dyestuff acid, the mixture is filtered, the dyestuff acid is washed with a sodium chloride solution and then dissolved with addition of soda or ammonia in warm water which is at a temperature of about 40°. After cooling, the sodium or ammonium salt of the dyestuff is separated by salting out in the form of beautifully crystallized, fine red, shining flakes. The dyestuff dissolves with difficulty in cold water but easily in hot water, yielding clear bluish-red colored solutions. In concentrated sulfuric acid it yields yellowish-red solutions. The dyestuff is absorbed on acetate silk in a neutral or weakly acid bath in clear, bluish-red shades fast to washing, water and light. In printing on acetate silk it yields a beautiful bluish-red of the same fastness.

The dyestuff, in the form of its ammonium salt, has most probably the formula:

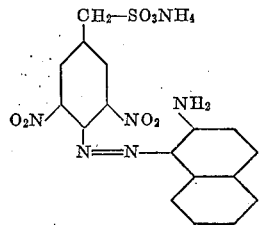

Additional examples of these new dyestuffs are given in the following table:

| Diazo compound of— | Coupled with— | Dyeing shades on acetate silk or wool |
|---|---|---|
| 2-aminobenzyl-ω-sulphonic acid. | Methylbenzylaniline | Yellow. |
| 4-aminobenzyl-ω-sulphonic acid. | Methyl-2-naphthylamine | Orange. |
| 5-nitro-2-aminobenzyl-ω-sulphonic acid. | Methyldiphenylamine | Red. |
| 3.5-dinitro-2-aminobenzyl-ω-sulphonic acid. | Ethylbenzylaniline | Bordeaux. |
| 5-nitro-2-aminobenzyl-ω-sulphonic acid. | Hydr-oxyethyl-2-naphthylamine. | Reddish violet. |
| 3.5-dinitro-4-aminobenzyl-ω-sulphonic acid. | Ethyl-2-naphthylamine | Bordeaux. |
| 3.5-dinitro-4-aminobenzyl-ω-sulphonic acid. | 2-naphthylamine | Bluish-red. |

The hydroxyethyl-2-naphthylamine is prepared according to German Patent 442,310, I. G. Farbenindustrie Akt.-Ges. patented from Nov. 17, 1924, "Erteilung" March 10, 1927.

The 3.5-dinitro-4-aminobenzyl-ω-sulphonic acid is prepared from the 3.5-dinitro-4-chlorbenzyl-ω-sulphonic acid of German Patent 134,988 by substitution of an amino group for the halogen in the usual way.

The dyestuff prepared by coupling the diazo compound of 5-nitro-2-amino-benzyl-ω-sulphonic acid with hydroxyethyl-2-naphthylamine has most probably the formula:

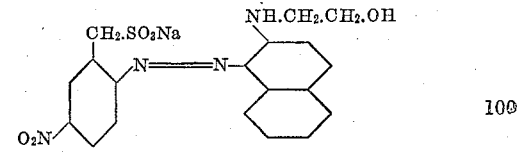

The dyestuffs of this invention are dark powders, most of which dissolve with difficulty or moderately in cold water and dissolve easily in hot water. Most of them separate from a not too dilute aqueous solution in a beautifully crystallized form. These new products dissolve easily in concentrated sulfuric acid, yielding beautiful yellow, red, violet or blue colored solutions.

The term "organo-oxycellulose material" is to be understood as including acetylcelluloses, cellulose ethers, cellulose esters, and their conversion products such as artificial silk.

We claim:

1. As new products the compounds of the general formula:

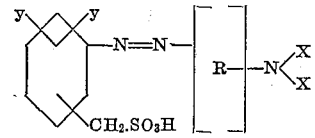

wherein R represents a nucleus of the group including the benzene and naphthalene series not substituted by a substituent of the group including the sulphonic acid, carboxylic acid and hydroxyl groups, X represents hydrogen, alkyl, aryl or aralkyl, and y represents hydrogen or the nitro group.

2. As new products the compounds of the general formula:

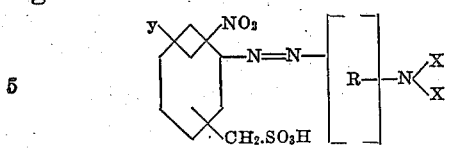

wherein R represents a nucleus of the group including the benzene and naphthalene series not substituted by a substituent of the group including the sulphonic acid, carboxylic acid and hydroxyl groups, X represents hydrogen, alkyl, aryl or aralkyl, and y stands for hydrogen or the nitro group.

3. As new products the compounds of the general formula:

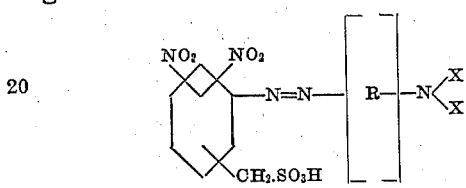

wherein R represents a nucleus of the group including the benzene and naphthalene series not substituted by a substituent of the group including the sulphonic acid, carboxylic acid and hydroxyl groups, and X represents hydrogen, alkyl, aryl or aralkyl.

4. As new products the compounds of the general formula:

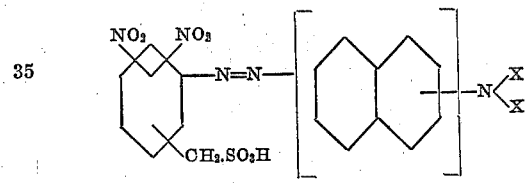

wherein X stands for hydrogen, alkyl or aralkyl.

5. As new products the compounds of the general formula:

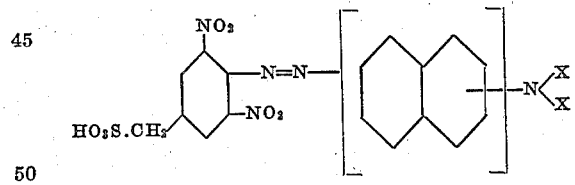

wherein X stands for hydrogen, alkyl or aralkyl.

6. As a new product the compound of the general formula:

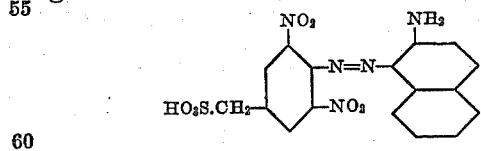

dyeing acetate silk from a neutral or weakly acid bath clear, bluish-red shades, fast to washing, water, and light.

7. Organo-oxycellulose material dyed with a dyestuff of claim 1.

8. Organo-oxycellulose material dyed with a dyestuff of claim 2.
9. Organo-oxycellulose material dyed with a dyestuff of claim 3.
10. Organo-oxycellulose material dyed with a dyestuff of claim 4.
11. Acetate silk material dyed with a dyestuff of claim 1.
12. Acetate silk material dyed with a dyestuff of claim 2.
13. Acetate silk material dyed with a dyestuff of claim 3.
14. Acetate silk material dyed with a dyestuff of claim 4.
15. Organo-oxycellulose material dyed with a dyestuff of claim 5.
16. Organo-oxycellulose material dyed with a dyestuff of claim 6.
17. Acetate silk material dyed with a dyestuff of claim 5.
18. Acetate silk material dyed with a dyestuff of claim 6.

In testimony whereof we have hereunto set our hands.

WALTER DUISBERG.
WINFRID HENTRICH.
LUDWIG ZEH.